March 12, 1940.   I. RICHARDSON   2,193,492
INSECT TRAP
Filed Jan. 28, 1938
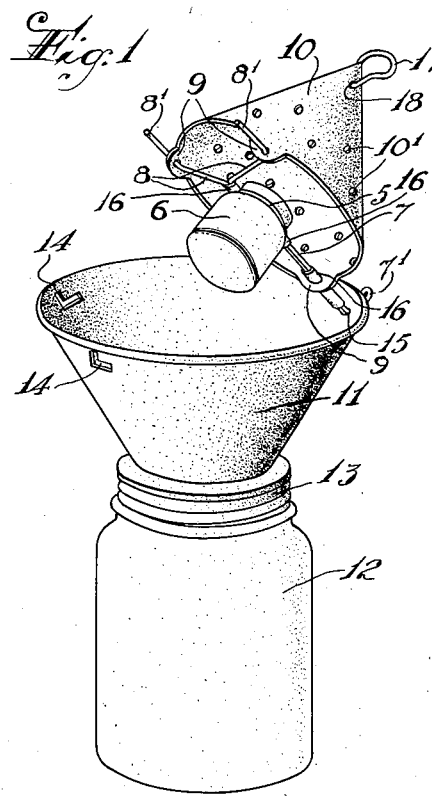
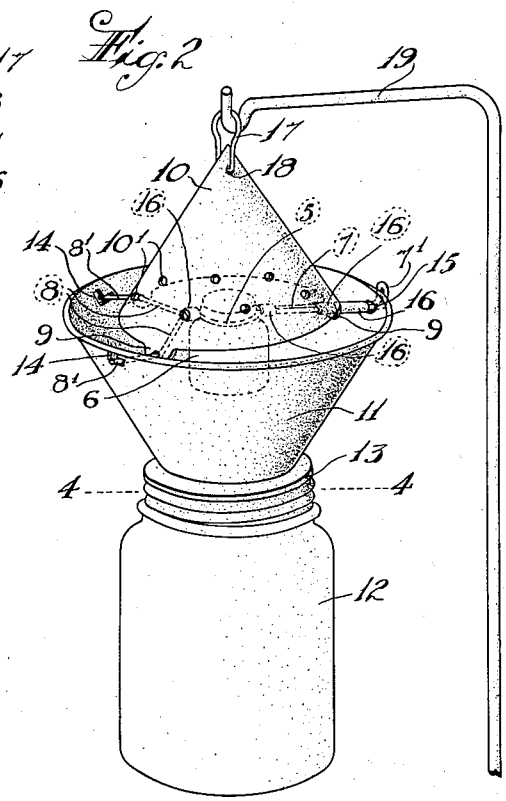
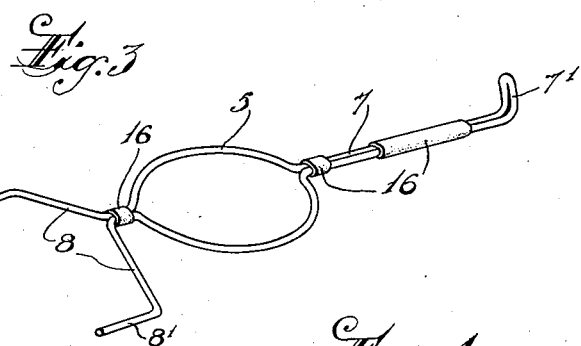
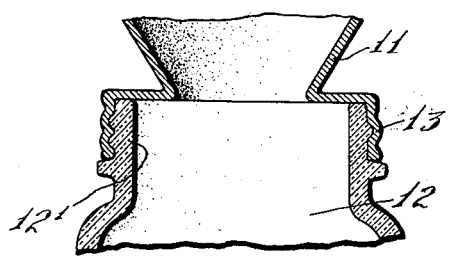
INVENTOR
I. RICHARDSON
BY
ATTORNEY Patented Mar. 12, 1940

2,193,492

UNITED STATES PATENT OFFICE 2,193,492

INSECT TRAP

Irving Richardson, Newark, N. J.

Application January 28, 1938, Serial No. 187,444

5 Claims. (Cl. 43—107)

This invention relates to improvements in insect traps designed to attract and trap Japanese beetles and other insects.

It is the object of my invention to provide an insect trap of practical, tamper-proof constitution, which can be readily assembled and disassembled by the average user without the necessity of using tools or requiring elaborate instructions.

A further object of my invention is to provide an insect trap wherein the bait or attractant is held in a container which is removably secured to a holder element the latter also carrying a cone provided with apertures to assist in the diffusion and volatilization of the scent or vapors of the bait or attractant, the holder element being provided with outwardly directed arms to removably secure it to a funnel member, the latter being removably secured to a jar for holding the trapped insects.

In the accompanying drawing, in which is shown one of the various possible embodiments of the several features of the invention, and wherein like reference numerals indicate like parts:

Fig. 1 represents a perspective view of an insect trap made in accordance with my invention, showing the holder element about to be secured in position within the funnel member, Fig. 2 represents a similar view, the holder element being shown positioned within the funnel member the device being shown suspended from a standard, Fig. 3 represents a perspective view of the holder element, and Fig. 4 represents a transverse sectional view taken on line 4—4 of Fig. 2.

Referring to the drawing, the insect trap of my invention is shown to comprise, essentially, a holder element provided with a centrally arranged ring 5 adapted to threadedly or otherwise engage the bait or attractant container 6, to removably secure the latter thereto. The holder element is provided with an arm 7 having an upturned end 7' and with a pair of arms 8 having angularly directed portions 8' for a purpose presently described. The arms 7, 8—8 of the holder element are passed through apertured ears 9 of a cone 10 to secure the cone thereto. A funnel member 11 is removably secured to a jar 12 by any suitable means, as by providing the funnel member with a threaded neck 13 to engage a correspondingly threaded neck 12' of the jar 12. The funnel member 11 is provided with a pair of L shaped apertures 14 and with an aperture 15. To assemble the device, the holder element (with the container 6 and cone 10 secured thereto) is secured to the funnel member 11 by first passing the upturned end 7' of the holder element through funnel aperture 15 as in Fig. 1. The outer extremities of the angularly directed portions 8' of the holder element are spaced apart slightly more than the vertical portions of the slots 14. Said outer extremities 8' are manually contracted and inserted in the vertical portions of funnel slots 14 and, due to their tension, will expand to the remote ends of the horizontal portions of said slots as in Fig. 2, removably locking the parts together. The holder element may be made of a single piece of wire of the configuration shown in Fig. 3 and reenforced with bands 16, if desired.

The cone 10 is preferably provided with apertures 10' to facilitate the diffusion and volatilization of the scent or vapors of the bait or attractant in container 6. A loop 17 freely passes through apertures 18 at the apex of cone 10, enabling the device to be suspended from a standard 19 fixed in the ground.

Insects attracted to the trap strike the cone 10 and pass through funnel 11, into jar 12 where they are trapped and from which they may be removed from time to time, by merely disengaging the funnel from the jar. The container 6 may be readily removed by disengaging the holder element ends 8' from the funnel slots 14 as in Fig. 1 and then disengaging the container from the ring 5 to replenish the bait or attractant.

Having thus described my invention what I claim as new and desire to secure by Letters Patent, is:

1. An insect trap comprising a holder element, a bait container and a cone secured thereto, a jar, and a funnel secured to said jar, said holder element being provided with means to removably secure it to the funnel.

2. An insect trap comprising a holder element provided with outwardly directed arms, a bait container and cone secured to said element, a jar, and a funnel secured to said jar, said funnel being provided with apertures to removably receive the outwardly directed arms of said holder element.

3. In a device of the character described, a funnel provided with an aperture and with a pair of L shaped apertures, and a holder element provided with an outwardly directed arm having an upturned end adapted to be passed through the first mentioned aperture and having angularly directed arms adapted to be passed through the L shaped apertures to removably secure the holder element to the funnel.

4. In a device of the character described, a jar, a funnel secured thereto, a cone provided with depending ears, and a holder element provided with arms engaging said ears and engaging said funnel to removably secure the cone to the funnel.

5. In a device of the character described, a funnel provided with apertures, and a holder element pivotally secured to said funnel and provided with flexible arms adapted to be manually compressed relatively to each other for insertion into said apertures and to automatically expand therein to removably secure the holder element to the funnel.

IRVING RICHARDSON.